United States Patent
Nakanishi et al.

[11] Patent Number: 5,372,433
[45] Date of Patent: Dec. 13, 1994

[54] BEARING DEVICE FOR AN ELECTRIC MOTOR

[75] Inventors: Toru Nakanishi; Hisaya Nakagawa, both of Nagano, Japan

[73] Assignee: Kabushiki Kaisha Sankyo Seiki Seisakusho, Nagano, Japan

[21] Appl. No.: 201,028

[22] Filed: Feb. 24, 1994

[30] Foreign Application Priority Data

Feb. 25, 1993 [JP]  Japan ................. 5-012271[U]

[51] Int. Cl.⁵ .................... F16C 23/02; F16C 33/04
[52] U.S. Cl. .......................... 384/192; 384/279; 384/295
[58] Field of Search ............ 384/192, 193, 279, 295, 384/276

[56] References Cited

U.S. PATENT DOCUMENTS

| | | | |
|---|---|---|---|
| 2,332,232 | 10/1943 | Kauffman, 2nd | 384/192 X |
| 3,679,276 | 7/1972 | Stenlund | 384/295 |
| 4,605,363 | 8/1986 | Walsh | 384/192 X |
| 5,120,140 | 6/1992 | Nakagawa et al. | 384/279 |
| 5,161,748 | 11/1992 | Iguchi et al. | 384/192 X |

*Primary Examiner*—Thomas R. Hannon
*Attorney, Agent, or Firm*—Sughrue, Mion, Zinn, Macpeak & Seas

[57] ABSTRACT

An object of this invention is to provide a bearing device for an electric motor in which a bearing holder holding an oil-impregnated bearing provides good area contact from the beginning and can be readily formed with high productivity. In the bearing device for an electric motor in which a bearing-supporting cylindrical recess is formed in one end face of a bearing holder in the form of a hollow cylinder, and an oil-impregnated bearing having a shaft-inserting hole is fixedly fitted in the bearing-supporting cylindrical recess in such a manner that the shaft-inserting hole of the oil-impregnated bearing is inclined with respect to the central axis P of the bearing holder; the bearing-supporting cylindrical recess of the bearing holder is defined by a cylindrical surface whose diameter is slightly smaller than the outside diameter of the oil-impregnated bearing and which is in parallel with the central axis P of the bearing holder, and an abutting annular surface inclined with respect to the central axis P, and the oil-impregnated bearing is arranged inclined in the bearing-supporting cylindrical recess being abutted against the abutting annular surface.

3 Claims, 3 Drawing Sheets

BEARING DEVICE FOR AN ELECTRIC MOTOR

BACKGROUND OF THE INVENTION

1. Field of the Invention

This invention relates to bearing devices for electric motors, and more particularly to a bearing device which is suitably applicable to a capstan motor to support its shaft to which a side pressure is applied.

2. Related Art

A conventional bearing device of this type is designed as shown in FIG. 5. In FIG. 5, reference numeral 1 designates a bearing holder in the form of a hollow cylinder; and 2, the hollow of the bearing holder 1. A ball bearing 4 and an oil-impregnated bearing 3 are fixedly fitted in both end portions of the cylindrical bearing holder 1, so as to rotatably support a rotary shaft 5.

Let us consider the case where the bearing device is applied to a capstan motor adapted to drive a magnetic tape in an audio tape recorder or a VTR (video tape recorder); that is, the rotary shaft 5 is employed as the capstan shaft of the recorder. When, in this case, the pinch roller 6 of the recorder abuts against the upper end portion of the rotary shaft 5 protruded through the oil-impregnated bearing 3, to apply a side pressure to it, then as shown in FIG. 6 the rotary shaft is inclined, thus being brought into point or linear contact with both end faces of the oil-impregnated bearing 3. Under this condition, it is difficult to smoothly rotate the rotary shaft 5. Hence, as the case may be, aging is given to the rotary shaft and the oil-impregnated bearing; that is, the rotary shaft 5 is forcibly rotated for a predetermined period of time so as to grind the oil-impregnated gear 3 until the former 5 is in area contact with the latter 3.

However, the aging of the rotary shaft 5 and the oil-impregnated bearing 3 until they are brought into area contact with each other takes a considerably long period of time, thus lowering the productivity. In order to eliminate this difficulty, a bearing device as shown in FIG. 7 has been proposed in the art. That is, in the bearing device, a gear supporting annular recess 12 is formed in one end face of the bearing holder 10 in such a manner that it merges with the hollow 2. An oil-impregnated bearing 14 (FIG. 8) with a shaft-inserting hole 13, into which the rotary shaft is to be inserted, is fixedly fitted in the bearing-supporting cylindrical recess 12 in such a manner that its shaft-inserting hole 13 is in alignment with the central axis P of the bearing holder 10, and the cylindrical surface of the shaft-inserting hole 13 is slightly inclined with respect to the central axis P of the bearing holder 10.

In the above-described bearing device, the cylindrical surface of the shaft-inserting hole 13 of the oil-impregnated bearing 14 is slightly inclined with respect to the central axis P of the bearing holder 10. Hence, when the rotary shaft is inclined by the side pressure, the cylindrical surface of the shaft-inserting hole 13 of the oil-impregnated bearing 14 and the rotary shaft are quickly brought into area contact with each other; that is, the aging is achieved quickly.

The above-described conventional bearing device is advantageous in that it can be used from the beginning with the rotary shaft and the oil-impregnated bearing in good area contact with each other. However, since the cylindrical surface of the bearing-supporting cylindrical recess 12 of the bearing holder 10 in which the oil-impregnated bearing 14 is set, is slightly inclined with respect to the central axis P of the bearing holder 10, the bearing device is still disadvantageous in the following point: Because of the above-described structure, in forming the bearing holder by resin molding, or by aluminum die casting or zinc die casting, the movable pin of a metal mold (not shown) for forming the bearing-supporting cylindrical recess 12 must be moved while being kept inclined. However, with an ordinary metal mold, it is difficult to move the movable pin in this manner. Thus, the formation of the bearing holder requires considerably high technique, and accordingly an expensive apparatus. In addition, for the same reason, the productivity is low.

SUMMARY OF THE INVENTION

An object of this invention is to eliminate the above-described difficulties accompanying a conventional bearing device for an electric motor. More particularly, an object of the invention is to provide a bearing device for an electric motor in which a bearing holder holding an oil-impregnated bearing provides good area contact from the beginning, and can be readily formed with high productivity.

According to an aspect of the present invention, there is provided that a bearing device for an electric motor comprises a bearing holder having a hollow portion, a bearing-supporting cylindrical recess being formed in one end face of the bearing holder; and an oil-impregnated bearing having a shaft-inserting hole, the oil-impregnated bearing being fixedly fitted in the bearing-supporting cylindrical recess with the shaft-inserting hole of the oil-impregnated bearing which is inclined with respect to the central axis of the bearing holder, wherein the bearing-supporting cylindrical recess of the bearing holder is formed in such a manner that a diameter of the bearing-supporting cylindrical recess is slightly smaller than the outside diameter of the oil-impregnated bearing and a cylindrical surface of the bearing-supporting cylindrical recess is in parallel with the central axis of the bearing holder, an abutting annular surface is provided on the bearing supporting cylindrical recess and inclined with respect to the central axis P of the bearing holder, and the oil-impregnated bearing is arranged inclined in the bearing-supporting cylindrical recess and is abutted against the abutting annular surface.

As was described above, in the bearing device according to the invention, the bearing-supporting cylindrical recess of the bearing holder is so shaped that its diameter is slightly smaller than the outside diameter of the oil-impregnated bearing, and its inner cylindrical surface is in parallel with the central axis of the bearing holder, and that its abutting annular surface is inclined with respect to the central axis. Hence, in forming the bearing-supporting cylindrical recess, the movable pin of the metal mold can be moved parallel similarly as in the case of an ordinary metal mold. Thus, the bearing holder can be readily manufactured with high productivity. When the oil-impregnated bearing is pushed against the abutting annular surface of the bearing-supporting cylindrical recess, it is held inclined in the latter. Hence, the rotary shaft and the cylindrical surface of the shaft-inserting hole of the oil-impregnated bearing are brought into good area contact with each other from the beginning, which reduces the aging time as much.

DETAILED DESCRIPTION OF THE PREFERRED EMBODIMENTS

Preferred embodiments of this invention will be described with reference to the accompanying drawings.

Figure 1:
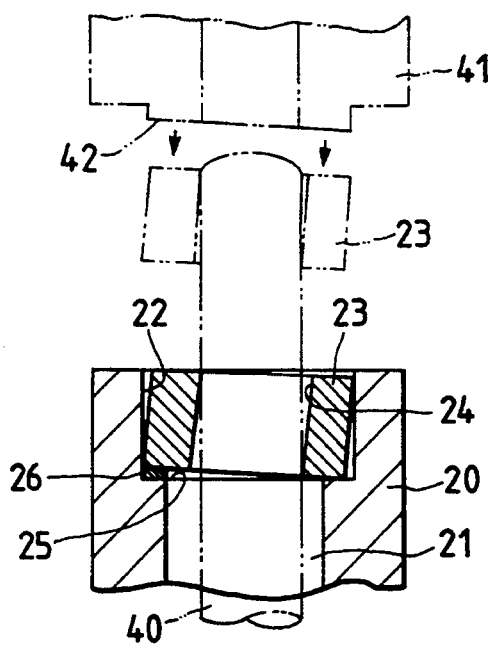
FIG. 1 is a sectional view showing a bearing device for an electric motor, which constitutes a first embodiment of this invention.

A bearing device for an electric motor, which constitutes a first embodiment of the invention, is as shown in FIG. 1. That is, a cylindrical bearing holder 20 of synthetic resin has a hollow 21 which is extended vertical in FIG. 1, and the hollow 21 has a bearing-supporting cylindrical recess 22 which is formed in one end face of the bearing holder 20 in such a manner that it merges with the hollow 21. The diameter of the bearing-supporting cylindrical recess 22 is slightly larger (as much as 0 to 40 μm) than the outside diameter of an oil-impregnated bearing 23 (described later). The bearing-supporting cylindrical recess 22 of the bearing holder 20 is in parallel with or coaxial with the central axis P of the bearing holder 20. Hence, in forming the bearing holder 20 by molding, the movable pin of the metal mold can be moved axially; that is, the metal mold may be an ordinary one. In this connections it goes without saying that the bearing holder 20 may be formed by aluminum die casting or zinc die casting.

Figure 2:
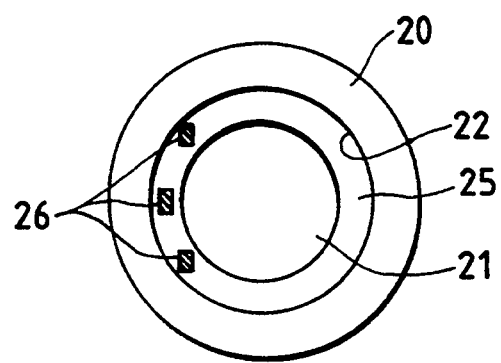
FIG. 2 is a plan view of the bearing device shown in FIG. 1.

The bearing-supporting cylindrical recess 22 of the bearing holder 20 has an annular bottom, namely, an abutting bottom surface 25; that is, the bearing-supporting cylindrical recess 22 is defined by the above-described cylindrical surface and the abutting annular surface 25. A plurality of protrusions 26 are formed on the abutting annular surface 25 which are off-centered as shown in FIG. 2, and the oil-impregnated bearing 23 is brought into contact with the abutting annular surface 25 so that the oil-impregnated bearing 23 is inclined with respect to the central axis P of the bearing holder 20. The height of the protrusions 26 is determined according to given conditions such as the outside diameter of the rotary shaft and a bearing span. For instance in the case where the outside diameter of the rotary shaft is 3.5 mm, and the bearing span is 18 mm, the height of the protrusions 26 is of the order of 60 μm.

Figure 8:
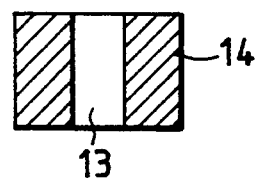
FIG. 8 is a sectional view of an oil-impregnated bearing.

On the other hand, an oil-impregnated bearing 23 is formed as shown in FIG. 8; that is, it has a shaft-inserting hole 24 which is extended axially. The oil-impregnated bearing 23 thus formed is press-fitted in the supporting annular recess 22 in such a manner that the lower end face of the oil-impregnated bearing 23 is in contact with the abutting annular surface 25 on one side and with the protrusions 25 on the other side which is diametrically opposite to the one side. In fitting the oil-impregnated bearing 23 into the supporting annular recess 22, jigs indicated by the two-dot chain lines in FIG. 1 may be used.

That is, a cylindrical guide bar 40 is inserted into the hollow 21 of the bearing holder 20 so that it is extended above the bearing holder 20, and then the oil-impregnated bearing 23 is mounted on the guide bar 40. Under this condition, a press-fitting punch 41 is used to push the oil-impregnated bearing 23 down the guide bar 40. The pushing surface 42 of the press-fitting punch 41 is inclined similarly as in the case of the abutting annular surface 25. The pushing surface 42 is allowed to abut against the oil-impregnated bearing 23. Therefore, the oil-impregnated bearing 23 is set inclined as shown in FIG. 1. Under this condition, the oil-impregnated bearing 23 is press-fitted into the bearing-supporting cylindrical recess 22. After the lower end face of the oil-impregnated bearing 23 abuts against the abutting surface 25, the guide bar 40 is pulled out. Thus, the oil-impregnated bearing has been press-fitted in the bearing-supporting cylindrical recess 22.

That is, when the oil-impregnated bearing 23 is press-fitted in the supporting annular recess 22, the lower end portion of the outer cylindrical surface of the oil-impregnated bearing 23 abuts against the cylindrical surface of the bearing-supporting cylindrical recess 22 on the side where the protrusions 26 are provided while the upper end portion of the outer cylindrical surface of the oil impregnated bearing 23 abuts against the cylindrical surface of the bearing-supporting cylindrical recess 22 on the opposite side. Under this condition, the central axis Q of the shaft-inserting hole 24 of the oil-impregnated bearing 23 is slightly inclined with respect to the central axis P of the bearing holder 20. The direction of inclination of the central axis Q is coincided with the direction of movement of the above-described pinch roller 6.

The bearing device is designed as described above. Hence, even when the rotary shaft supported by the oil-impregnated bearing 23 is bent by a side pressure, immediately the rotary shaft is brought into area contact with the cylindrical surface of the shaft-inserting hole 24 of the oil-impregnated bearing.

Figure 3:
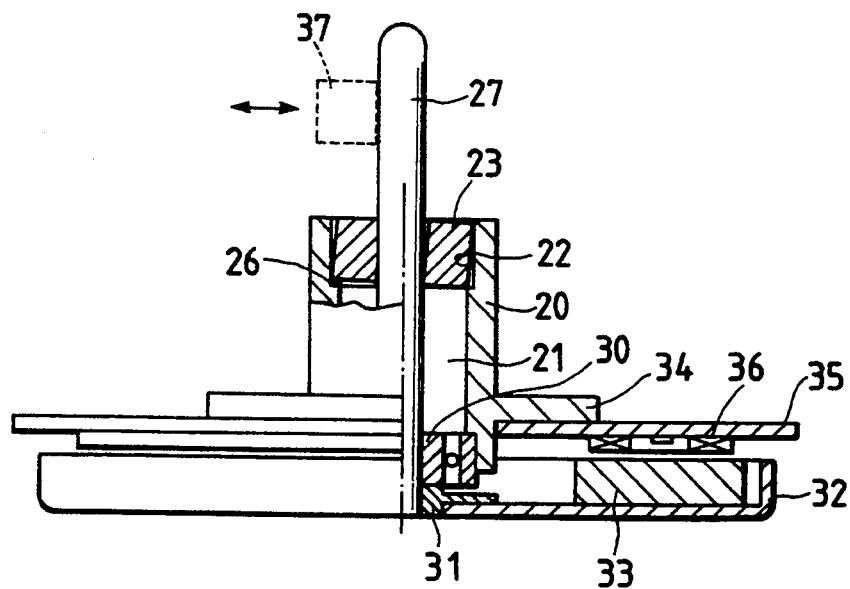
FIG. 3 is a front view, partly as a sectional view, showing a capstan motor to which the bearing device shown in FIG. 1 is applied.

The bearing device may be applied to a capstan motor as shown in FIG. 3. Similarly as in the case of FIG. 1, the oil-impregnated bearing 23 is fixedly fitted in the hollow 21 of the bearing holder 20 on one side, and a ball bearing 30 is fixedly fitted in the hollow 21 on the other side. Those two bearings 23 and 30 support a rotary shaft 27; i.e., a capstan shaft. The ball bearing 30 may be replaced with an oil-impregnated bearing. One end portion of the rotary shaft 27 is protruded through the ball bearing 30 and fixedly secured through a bushing 31 to a flat rotor yoke 32 which is substantially in the form of a dish. An annular drive magnet 33, which is magnetized to have a plurality of magnetic poles, is fixedly mounted on the inner surface of the rotor yoke 32.

A circuit board 35, which is used as a stator yoke, too, is fixedly mounted on a flange 34 which is formed on the outer cylindrical surface of the bearing holder 20. A plurality of drive coils 36 are arranged on the circuit board 35 in such a manner that they confront with the above-described drive magnet 33. On the other hand, the other end portion of the rotary shaft 27 is extended outside through the oil-impregnated bearing 23, so that it is pushed by a pinch roller 37 which is moved laterally towards and away from the rotary shaft 27. As the rotary shaft 27 rotates, a magnetic tape (not shown) interposed between the rotary shaft 27 and the pinch roller 37 is run at a predetermined speed.

Figure 4:
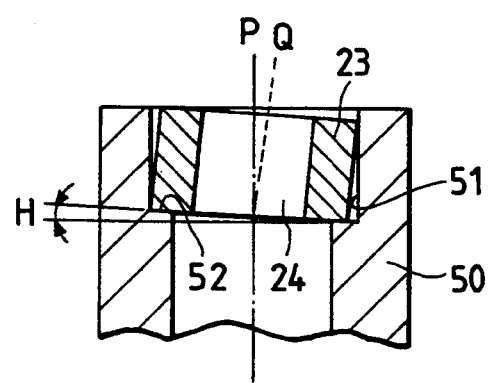
FIG. 4 is a sectional view of a bearing device, which constitutes a second embodiment of the invention.
Figure 5:
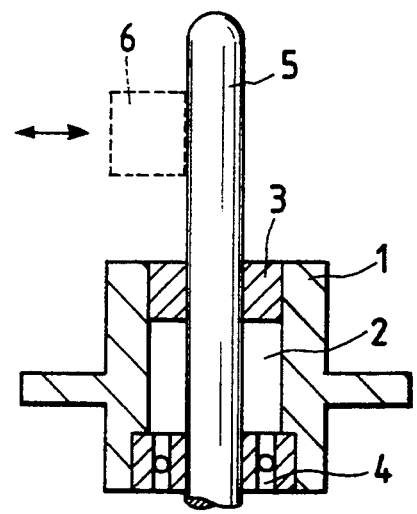
FIG. 5 is a sectional view of a conventional bearing device for an electric motor.
Figure 6:
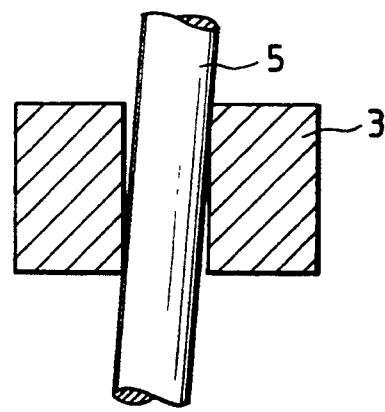
FIG. 6 is also a sectional view of the conventional bearing device.
Figure 7:
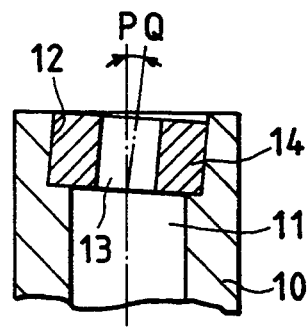
FIG. 7 is a sectional view showing a bearing device which is obtained by improving the conventional bearing device.

FIG. 4 shows a second embodiment of the invention. As shown in FIG. 4, a bearing holder 50 has a bearing-supporting cylindrical recess 51 whose bottom is an annular surface 52 (hereinafter referred to as "an abutting annular surface 52", when applicable). The abutting annular surface 52 is a flat surface which is inclined with respect to the central axis P of the bearing holder 50, thus providing a height difference H which, similarly as in the above-described first embodiment, is determined according to given conditions.

The two preferred embodiments of the invention have been described; however, the invention is not limited thereto or thereby. For instance, the ball bearing in the opposite end portion of the bearing holder may be a cylindrical oil-impregnated bearing. That is, it will be obvious to those skilled in the art that various changes and modifications may be made in the embodiments without departing from the invention.

As was described above, in the bearing device according to the invention, the bearing-supporting cylindrical recess of the bearing holder is so shaped that its diameter is slightly smaller than the outside diameter of the oil-impregnated bearing, and its inner cylindrical surface is in parallel with the central axis of the bearing holder, and that its abutting annular surface is inclined with respect to the central axis. Hence, in forming the bearing-supporting cylindrical recess, the movable pin of the metal mold can be moved parallel similarly as in the case of an ordinary metal mold. Thus, the bearing holder can be readily manufactured with high productivity. When the oil-impregnated bearing is pushed against the abutting annular surface of the bearing-supporting cylindrical recess, it is held inclined in the latter. Hence, the rotary shaft and the cylindrical surface of the shaft-inserting hole of the oil-impregnated bearing are brought into good area contact with each other from the beginning, which reduces the aging time as much.

What is claimed is:

1. A bearing device for an electric motor comprising:
    a bearing holder having a hollow portion, a bearing-supporting cylindrical recess being formed in one end face of the bearing holder; and
    an oil-impregnated bearing having a shaft-inserting hole, the oil-impregnated bearing being fixedly fitted to the bearing-supporting cylindrical recess with the shaft-inserting hole of the oil-impregnated bearing which is inclined with respect to the central axis of the bearing holder,
    wherein the bearing-supporting cylindrical recess of the bearing holder is formed in such a manner that a diameter of the bearing-supporting cylindrical recess is slightly smaller than the outside diameter of the oil-impregnated bearing and a cylindrical surface of the bearing-supporting cylindrical recess is in parallel with the central axis of the bearing holder, an abutting annular surface is provided on the bearing supporting cylindrical recess and inclined with respect to the central axis of the bearing holder, and the oil-impregnated bearing is arranged inclined in the bearing-supporting cylindrical recess and is abutted against the abutting annular surface.

2. A bearing device as claimed in claim 1, wherein the electric motor corresponds to a capstan motor with a driven rotor of a pinch roller pushed against a capstan shaft protruded through the oil-impregnated bearing.

3. A bearing device as claimed in claim 2, wherein the direction of inclination of the oil-impregnated bearing is in alignment with the direction in which the driven rotor of the pinch roller pushes the capstan shaft from the side.

* * * * *